(12) United States Patent
Epshteyn

(10) Patent No.: US 7,373,870 B2
(45) Date of Patent: May 20, 2008

(54) UNIVERSAL HYBRID ENGINE, COMPRESSOR AND PUMP, AND METHOD OF OPERATION

(76) Inventor: Grigoriy Epshteyn, 804 Rossville Av, Staten Island, NY (US) 10309

( * ) Notice: Subject to any disclaimer, the term of this patent is extended or adjusted under 35 U.S.C. 154(b) by 455 days.

(21) Appl. No.: 11/110,109

(22) Filed: Apr. 20, 2005

(65) Prior Publication Data

US 2006/0239839 A1    Oct. 26, 2006

(51) Int. Cl.
*F01B 13/04*    (2006.01)
(52) U.S. Cl. .......................................... 92/12.2; 91/506
(58) Field of Classification Search ................. 92/12.2; 91/506; 60/490; 417/364; 123/56.3, 66, 123/68, 71 R
See application file for complete search history.

(56) References Cited

U.S. PATENT DOCUMENTS

| | | | | |
|---|---|---|---|---|
| 4,326,380 | A | 4/1982 | Rittmaster | 60/595 |
| 4,362,477 | A | 12/1982 | Patten | 417/364 |
| 4,369,021 | A | 1/1983 | Heintz | 417/364 |
| 4,415,313 | A * | 11/1983 | Bouthors et al. | 417/364 |
| 4,876,991 | A | 10/1989 | Galitello | 123/46 E |
| 4,924,956 | A | 5/1990 | Deng et al. | 180/65.3 |
| 4,992,031 | A * | 2/1991 | Sampo | 417/364 |
| 5,036,667 | A | 8/1991 | Thatcher | 60/595 |
| 5,167,292 | A | 12/1992 | Moiroux et al. | 180/165 |
| 5,261,797 | A | 11/1993 | Christenson | 417/380 |
| 5,464,331 | A | 11/1995 | Sawyer | 417/364 |
| 5,556,262 | A | 9/1996 | Achten et al. | 417/364 |
| 5,616,010 | A | 4/1997 | Sawyer | 417/364 |
| 6,293,231 | B1 | 9/2001 | Valentin | 123/46 R |
| 7,011,051 | B2 * | 3/2006 | Epshteyn | 417/364 |
| 7,047,867 | B2 * | 5/2006 | Kalkstein et al. | 92/12.2 |

* cited by examiner

*Primary Examiner*—Michael Leslie

(57) ABSTRACT

The universal hybrid (26) comprises a two-cycle engine (28), boosted by the engine power reciprocating compressor (32) and a hydraulic pump (34). The pump plunger (148) fastened to engine piston (72) provide direct energy transmission to the compressor and pump. The plunger and compressor piston (94) moving in opposite direction coupled each to one of two diametrically opposite rotor's (36) axial rods, which double-sided interact with the pivotable swash plate (42).

The swash plate turn provides simultaneously the engine, compressor and pump variable displacement volume with engine invariable compression ratio while the swash plate turn axis fixed. This increases the engine power range using the minimum specific fuel consumption. The swash plate turn axis shifting provides the engine compression ratio change for the either kind of fuel use.

This combined factors provides the progressive hydrostatic transmission use instead of widespread automotive engine and automatic transmission, thereby minimizing the weight, installation space, cost, labor and fuel consumption.

14 Claims, 11 Drawing Sheets

2 — 2

UNIVERSAL HYBRID ENGINE, COMPRESSOR AND PUMP, AND METHOD OF OPERATION

CROSS-REFERENCE TO RELATED APPLICATIONS

Not Applicable

FEDERALLY SPONSORED RESEARCH

Not Applicable

SEQUENCE OF THE INVENTION

Not Applicable

BACKGROUND OF THE INVENTION

1. Field of the Invention

This invention relates to hydrostatic transmission, specifically to a system of internal combustion engine and pump, which are used for high pressurized fluid flow generation of such transmission.

2. Background of the Invention

The widespread engine and pump system with hydrostatic transmission is used to drive wheels and working equipment of widely known machinery-mountainous, construction, agricultural, transportation automotive and other heavy equipment.

System engine-pump are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,326,380 to Ritmasterl (1982), U.S. Pat. No. 4,362,477 to Patten (1982), U.S. Pat. No. 4,369,021 to Heintz (1983), U.S. Pat. No. 4,876,991 to Galitello (1989), U.S. Pat. No. 4,924,956 to Deng et al. (1990), U.S. Pat. No. 5,036,667 to Thatcher (1991), U.S. Pat. No. 5,167,292 to Moiroux et al. (1992), U.S. Pat. No. 5,261,797 to Christenson (1993), U.S. Pat. No. 5,464,331 to Sawyer (1995), U.S. Pat. No. 5,556,262 to Achten et al. (1996), U.S. Pat. No. 5,616,010 to Sawyer (1997), U.S. Pat. No. 6,293,231 to Valentin (2001) and U.S. patent application "The hybrid two cycle engine, compressor and pump and method of operation" Ser. No. 10/638,024 (filing date Aug. 08, 2003) to the same inventor Epshteyn.

While these devices fulfill their respective, particular objective and requirements, the aforementioned patents do not describe the universal hybrid engine, compressor and pump and method of operation for providing increased efficiency and specific power while minimizing the weight, installation space and fuel consumption.

The hybrid two-cycle engine, compressor and pump has the following disadvantages:

(a) The engine, compressor and pump fixed displacement volume prevent engine power from efficiently adapting to wide variable load and the speed range of an automotive.

(b) The engine, compressor and pump fixed displacement volume prevent the creation of a more environmentally-friendly internal combustion engine using the minimum specific fuel consumption in all modes of operation.

(c) The engine fixed displacement volume does not allow change of the compression ratio for using different fuels.

(d) The high power fixed displacement volume engine does not efficiently use the minimum capacity idling process and requires the high power starter.

(e) The single plunger pump has large change fluid feeding magnitude per cycle and does not provide for smooth power flow.

(f) The compressor valves camshaft disposition between the engine cylinders does not allow the modular engine block design.

(g) The compressor piston and the axial rod coupling mechanism motion within the rotor occurs without guide and this limits the compressor longevity and the power transmission.

(h) The widespread fixed displacement volume engine has only one magnitude of the cycle per minute with the minimum specific fuel consumption. This limits the necessary automotive load and speed range because the acceleration increases the specific fuel consumption. This engine defect corrected by means of complicated, heavy, high installation space, cost and labor widespread use of automatic transmission.

3. Objects and Advantages

Therefore, it can be appreciated that there exists a continuing need for a new and improved universal hybrid engine-pump for progressive hydrostatic transmission having better specific data than widespread automotive engine and automatic transmission.

The present invention substantially fulfills these needs.

The objectives and advantages of the present invention are:

(a) to adapt the engine power to wide variable load and the speed range of an automotive by means of the automatic turning of the swash plate (shoe plate) and simultaneously changing the engine, compressor and pump displacement volume;

(b) to provide an environmentally—friendly engine operating in all mode with minimum specific fuel consumption by means of engine, compressor and pump displacement volume changing;

(c) to allow for the utilization of different fuels and to transform the engine into an omnivorous engine by means of the swash plate turn axis shifting;

(d) to provide the engine, pump and compressor with smaller displacement volume, allowing minimum fuel consumption during the idling operation;

(e) to provide the pump more smooth power flow by means of the pump plunger and additional pistons joint operation within the rotor;

(f) to provide the modular engine block and pump housing with smaller weight, installation space, cost and labor, by means of the pump's rotor using the capacity of the compressor camshaft;

(g) to increase the compressor's piston drive mechanism longevity and power transmission by means of using the rotor guide grooves;

(h) to provide use of the progressive hydrostatic transmission with variable displacement volume of the engine, compressor, pump and hydraulic motor instead of the widespread automotive engine and automatic transmission, thereby minimizing the weight, installation space, cost, labor and fuel consumption.

Even more objectives and advantages will become apparent from a consideration of the ensuing description and drawings.

SUMMARY OF THE INVENTION

In accordance with the present invention the universal hybrid engine, compressor and pump, (which we shall refer to simply as "universal hybrid") is comprised a two-cycle engine, compressor, pump with rotor, synchronize mechanism with a pivotable swash plate, reducer, conic reducer, swash plate turn mechanism and the distance between rotor centerline and the swash plate turn axis change mechanism (which we shall refer to simply as "swash plate turn axis shift mechanism"), conventional accessory units, swash plate turn hydraulic system, swash plate turn axis shift hydraulic system and hydraulic control system associated with at least one conventional hydraulic motor.

The engine is comprised of a cylinder block with cooling system, piston with rings, modular cylinder head with combustion chamber, camshaft, exhaust valve and exhaust manifold. The piston located between the compressor chamber and combustion chamber, is comprised of an air injection valve.

The compressor is comprised of a piston with rings and the compressor chamber located between the engine and compressor pistons within the engine cylinder. The compressor piston fastened to a hub. The compressor is comprised of an intake manifold, intake and output valves with springs, which are located on the side surface of engine cylinder. The output valve is coupled with the air injection valve of the engine by a receiver, which is comprised of a water jacket and is located on the side surface of engine cylinder. The compressor intake valve is connected with the one lobe by means of rod and pivotably mounted rocker. The compressor output valve is connected with the second lobe by rod and both lobes fastened to pump's rotor.

The pump is comprised of modular housing, joined to the engine cylinder block and joined to a valve plate. A pump's rotor is comprised of a cylinder block fastened to an abutment, a plunger fastened to the engine piston and pistons with shoes. The rotor has a pump chamber with a canal and the plunger, rotor, compressor piston, hub are located coaxially. The rotor is coupled with the pump housing by a bearing with a spring. The valve plate connected to each rotor by a pump inlet and outlet slots, forming the circumference, coupled with the pump chamber by the rotor canal and fluidly connected with pump pistons.

The pump associated with the hydrostatic transmission conventional motor by pump outlet and inlet lines.

The synchronize mechanism is comprised of swash plate consisting of disk, bearing and plate, two diametrically opposite axial rods with spherical and cylindrical ends, shoes and washer-shoes, holder and pin-holder, compensate pistons, lever with sliders, axle, crossbar and hub. An axial rod's spherical ends coupled both with the disk and plate of the swash plate respective by diametrically opposite shoes and washer-shoes outside of the rotor. The first axial rod's cylindrical end coupled with the pump plunger and one compensate piston by means of the lever. The lever is pivotably coupled with the rotor by axle and sliders and pivotably coupled with the pump's plunger by sliders and crossbar and pivotably coupled with the first axial rod by means of pin-holder.

The second diametrically opposite axial rod's cylindrical end coupled with the compressor piston and second compensate piston by means of the hub pivotably connected with holder. The holder connected with rotor by means of ledges mounted within rotor's guide grooves.

The disk by bearing and disc spring is coupled with the plate and simultaneously associated with the pump's valve plate by swash plate turn mechanism and swash plate turn axis shift mechanism.

The reducer case is the valve plate and is comprised of gearwheels, bearings and shafts, which are connected to the rotors by toothed clutches and with the conic reducer's inlet shaft by the intermediate shaft.

The conic reducer's outlet shaft is coupled with the engine camshaft and pulley, which coupled with the belt.

The swash plate turn mechanism is comprised servo cylinder with piston and coaxially piping prop. The swash plate disk comprised a fork and ear. The fork coupled with piston by axle and sliders. The servo cylinder by means of prop connected to valve plate.

The swash plate turn axis shift mechanism is comprised of a servo cylinder with servo piston and coaxially piping prop. The servo piston is coupled with the swash plate ear by means of pin with slider, lever and hinge pin connecting the ear with lever. The lever coupled with the servo cylinder by means of shaft and the prop is a coaxially piping and fastened to said valve plate.

The swash plate turn hydraulic system is comprised of a hydraulic distributor with solenoids. A first and second lines of the distributor is connected with the servo cylinder by means of prop, third line is coupled with the tank and the fourth line of the distributor is associated with the hydraulic control system.

The swash plate turn axis shift hydraulic system comprised of a hydraulic distributor with solenoids. A first and second lines of the distributor is connected with the servo cylinder by means of prop, third line is coupled with the tank and the fourth line of the distributor is associated with the hydraulic control system.

The hydraulic control system is comprised of a hydraulic distributor with solenoids. The first line of the distributor is connected with the pump inlet line by a check valve, the second line is coupled with a pump outlet line, the third line is coupled with the tank and the fourth line of the distributor is coupled with the electric manometer, pneumohydraulic accumulator and a starter pump, which comprises of a pedal. The fourth line of the distributor is also coupled with the fourth line of the swash plate turn hydraulic system distributor. The second line of the distributor is also coupled with the fourth line swash plate turn axis shift hydraulic system distributor.

The accessory regular units (not illustrated)—cooling system pump, electric system generator, steering pump, associated with the belt.

There has thus been outlined, rather broadly, some features of the invention in order that the detailed description thereof that follows may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded is limiting.

As such, those skilled in the art will appreciate that the conception, upon which this disclosure is based, may readily be utilized as a basis for the designing of other structures, methods and system for carrying out the several purposes of the present invention. It is important, therefore, that the claims be regarded as including such equivalent constructions insofar as they do not depart from the spirit and scope of the present invention.

It is an object of the present invention to provide a new and improved hybrid, which has all the advantages of the prior art systems engine-pump and none of the disadvantages.

It is therefore an object of the present invention to provide simultaneously an engine, compressor and pump displacement volume change for adapting the engine power to wide variable load and speed range of automotive.

It is another object of the present invention to provide environmentally-friendly engine in all modes of operation with the minimum specific fuel consumption.

It is an object of the present invention to provide the capability to use different kinds of fuel and to transform the internal combustion engine into an omnivorous engine.

It is an object of the present invention to provide the engine, pump and compressor smaller displacement volume during the start and idling operation.

An even further object of the present invention is to provide use the modular engine block and pump housing with smaller weight, installation space, cost and labor.

Even still another object of the present invention increases the compressor transmission longevity and power.

Lastly, it is an object of the present invention to provide use of the progressive hydrostatic transmission with variable displacement volume of the engine, compressor, pump and hydraulic motor instead of widespread automotive engine and automatic transmission, thereby minimizing the weight, installation space, cost, labor and fuel consumption.

In accordance with the present invention the universal hybrid engine, compressor and pump, (which we shall refer to simply as "universal hybrid") is comprised a two-cycle engine, compressor, pump with rotor, synchronize mechanism with a pivotable swash plate, reducer, conic reducer, swash plate turn mechanism and the distance between rotor centerline and the swash plate turn axis change mechanism (which we shall refer to simply as "swash plate turn axis shift mechanism"), conventional accessory units, swash plate turn hydraulic system, swash plate turn axis shift hydraulic system and hydraulic control system associated with at least one conventional hydraulic motor.

The engine is comprised of a cylinder block with cooling system, piston with rings, modular cylinder head with combustion chamber, camshaft, exhaust valve and exhaust manifold. The piston located between the compressor chamber and combustion chamber, is comprised of an air injection valve.

The compressor is comprised of a piston with rings and the compressor chamber located between the engine and compressor pistons within the engine cylinder. The compressor piston fastened to a hub. The compressor is comprised of an intake manifold, intake and output valves with springs, which are located on the side surface of engine cylinder. The output valve is coupled with the air injection valve of the engine by a receiver, which is comprised of a water jacket and is located on the side surface of engine cylinder. The compressor intake valve is connected with the one lobe by means of rod and pivotably mounted rocker. The compressor output valve is connected with the second lobe by rod and both lobes fastened to pump's rotor.

The pump is comprised of modular housing, joined to the engine cylinder block and joined to a valve plate. A pump's rotor is comprised of a cylinder block fastened to an abutment, a plunger fastened to the engine piston and pistons with shoes. The rotor has a pump chamber with a canal and the plunger, rotor, compressor piston, hub are located coaxially. The rotor is coupled with the pump housing by a bearing with a spring. The valve plate connected to each rotor by a pump inlet and outlet slots, forming the circumference, coupled with the pump chamber by the rotor canal and fluidly connected with pump pistons. The pump associated with the hydrostatic transmission conventional motor by pump outlet and inlet lines.

The synchronize mechanism is comprised of swash plate consisting of disk, bearing and plate, two diametrically opposite axial rods with spherical and cylindrical ends, shoes and washer-shoes, holder and pin-holder, compensate pistons, lever with sliders, axle, crossbar and hub. An axial rod's spherical ends coupled both with the disk and plate of the swash plate respective by diametrically opposite shoes and washer-shoes outside of the rotor. The first axial rod's cylindrical end coupled with the pump plunger and one compensate piston by means of the lever. The lever is pivotably coupled with the rotor by axle and sliders and pivotably coupled with the pump's plunger by sliders and crossbar and pivotably coupled with the first axial rod by means of pin-holder.

The second diametrically opposite axial rod's cylindrical end coupled with the compressor piston and second compensate piston by means of the hub pivotably connected with holder. The holder connected with rotor by means of ledges mounted within rotor's guide grooves.

The disk by bearing and disc spring is coupled with the plate and simultaneously associated with the pump's valve plate by swash plate turn mechanism and swash plate turn axis shift mechanism.

The reducer case is the valve plate and is comprised of gearwheels, bearings and shafts, which are connected to the rotors by toothed clutches and with the conic reducer's inlet shaft by the intermediate shaft.

The conic reducer's outlet shaft is coupled with the engine camshaft and pulley, which coupled with the belt.

The swash plate turn mechanism is comprised servo cylinder with piston and coaxially piping prop. The swash plate disk comprised a fork and ear. The fork coupled with piston by axle and sliders. The servo cylinder by means of prop connected to valve plate.

The swash plate turn axis shift mechanism is comprised of a servo cylinder with servo piston and coaxially piping prop. The servo piston is coupled with the swash plate ear by means of pin with slider, lever and hinge pin connecting the ear with lever. The lever coupled with the servo cylinder by means of shaft and the prop is a coaxially piping and fastened to said valve plate.

The swash plate turn hydraulic system is comprised of a hydraulic distributor with solenoids. A first and second lines of the distributor is connected with the servo cylinder by means of prop, third line is coupled with the tank and the fourth line of the distributor is associated with the hydraulic control system.

The swash plate turn axis shift hydraulic system comprised of a hydraulic distributor with solenoids. A first and second lines of the distributor is connected with the servo cylinder by means of prop, third line is coupled with the tank and the fourth line of the distributor is associated with the hydraulic control system.

The hydraulic control system is comprised of a hydraulic distributor with solenoids. The first line of the distributor is connected with the pump inlet line by a check valve, the second line is coupled with a pump outlet line, the third line is coupled with the tank and the fourth line of the distributor is coupled with the electric manometer, pneumohydraulic accumulator and a starter pump, which comprises of a pedal. The fourth line of the distributor is also coupled with the fourth line of the swash plate turn hydraulic system distributor. The second line of the distributor is also coupled with the fourth line swash plate turn axis shift hydraulic system distributor The accessory regular units (not illustrated)—cooling system pump, electric system generator, steering pump, associated with the belt.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

DRAWINGS—FIGURES

Figure 1:
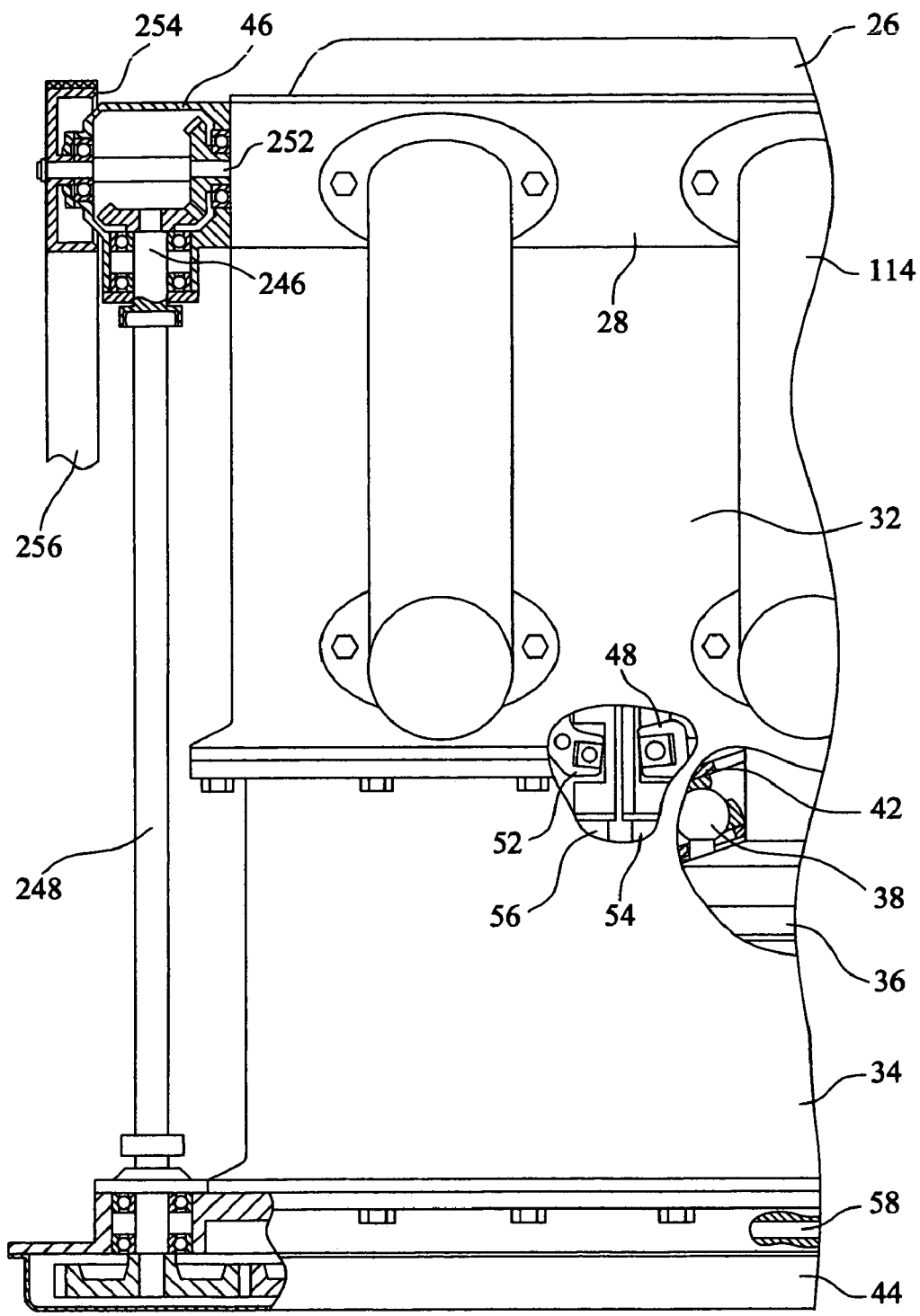
Figure 2:
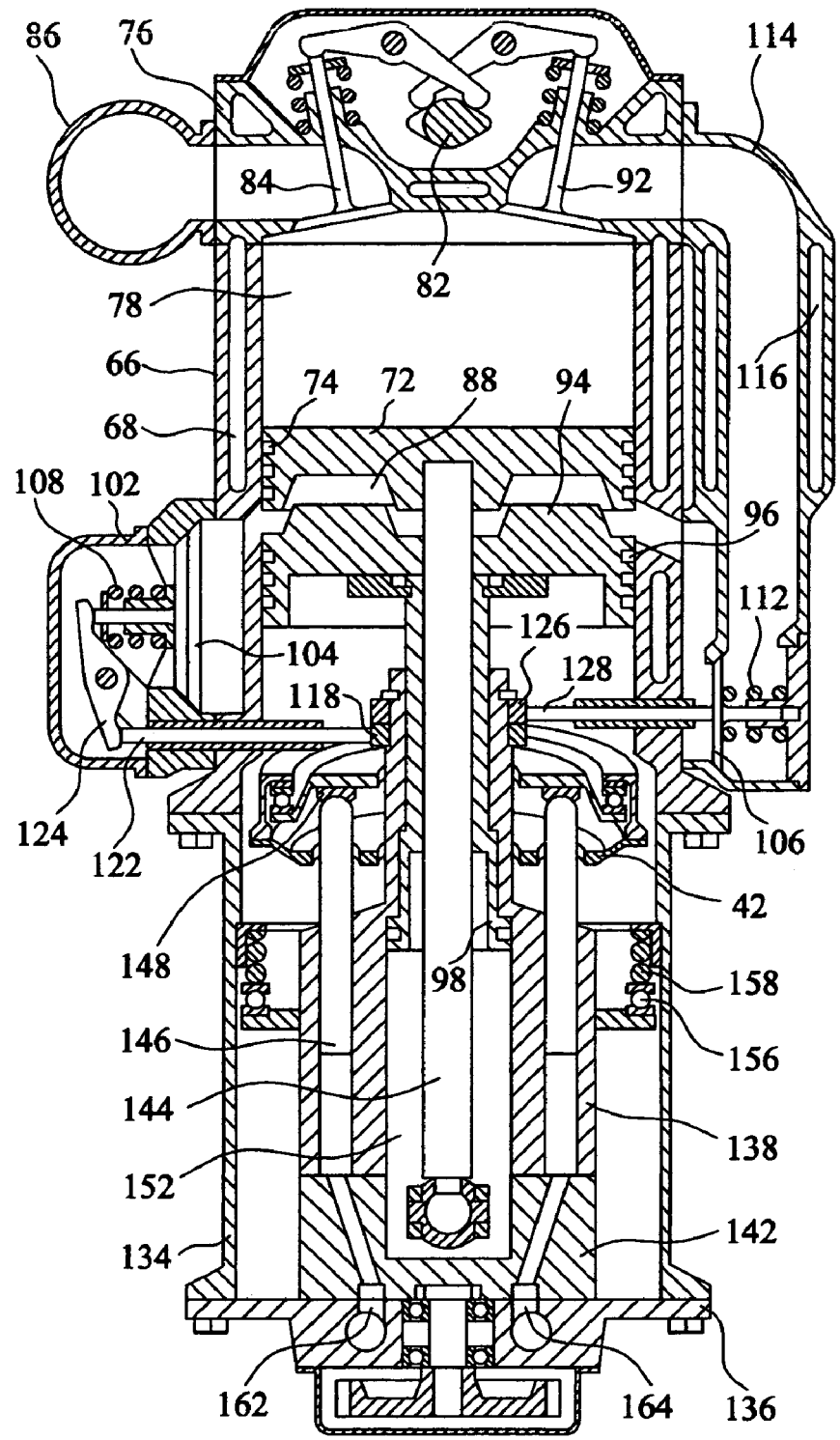
Figure 3:
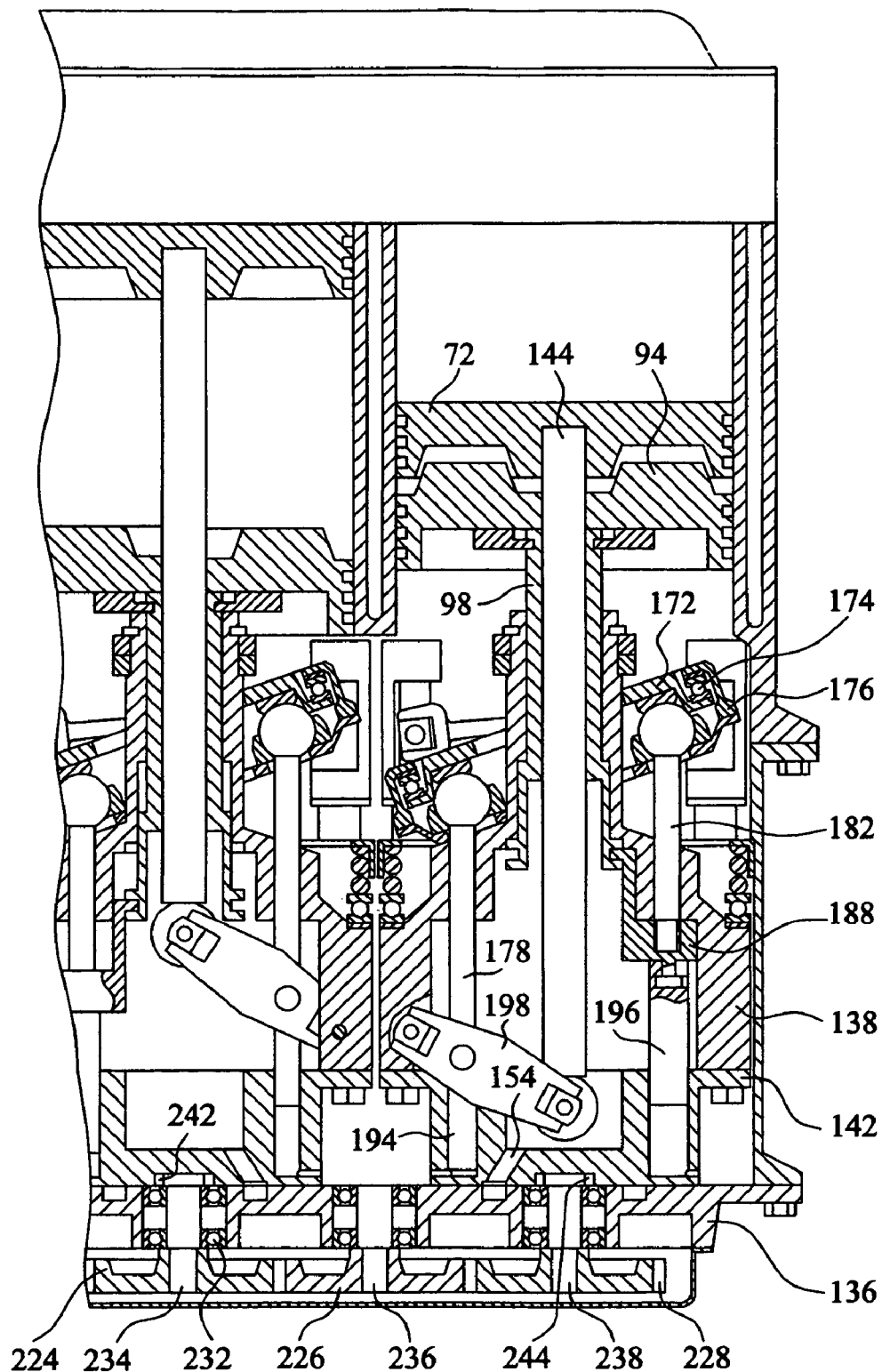
Figure 4:
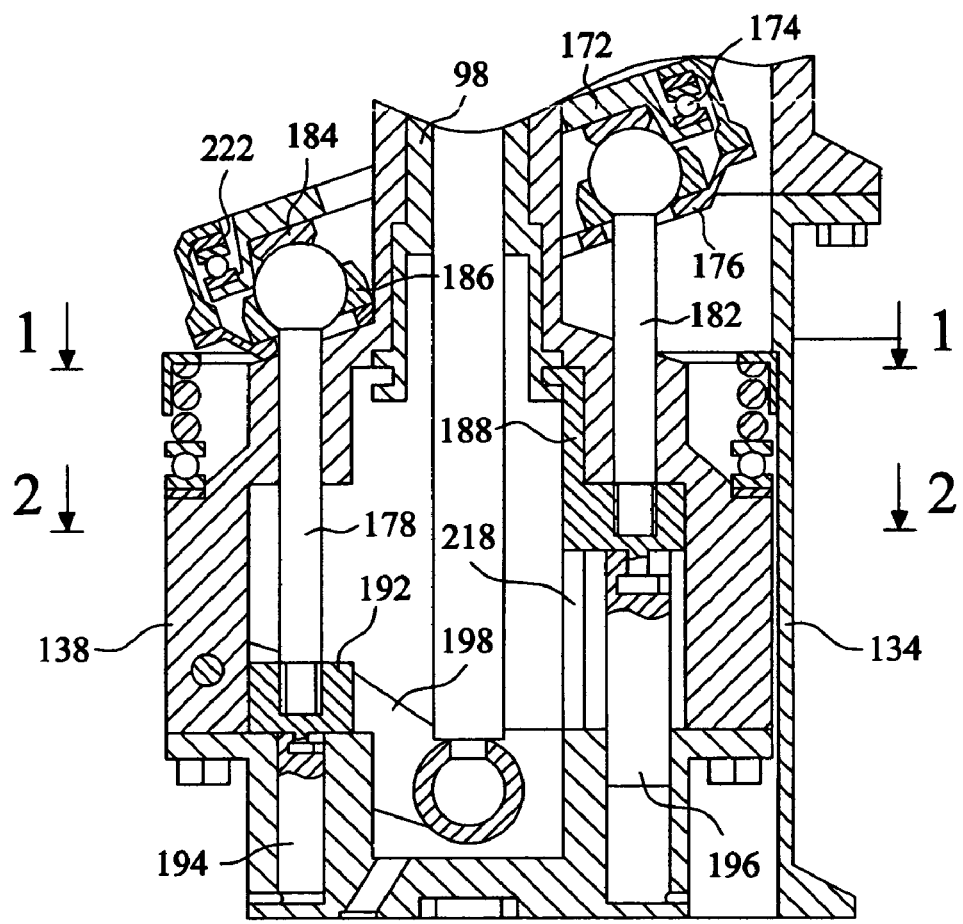
Figure 5:
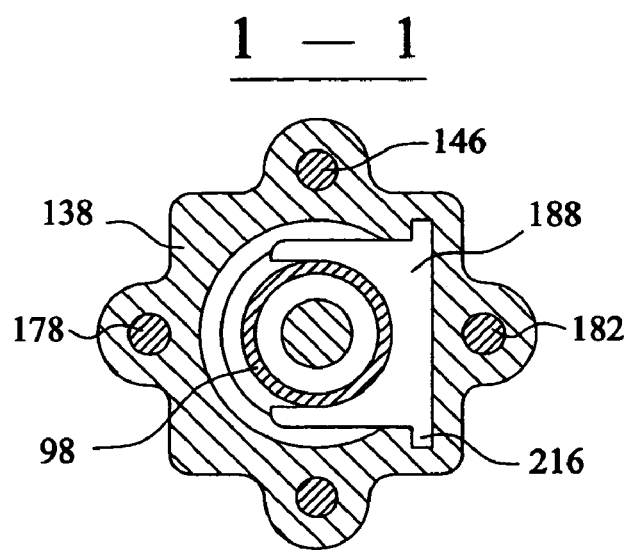
Figure 6:
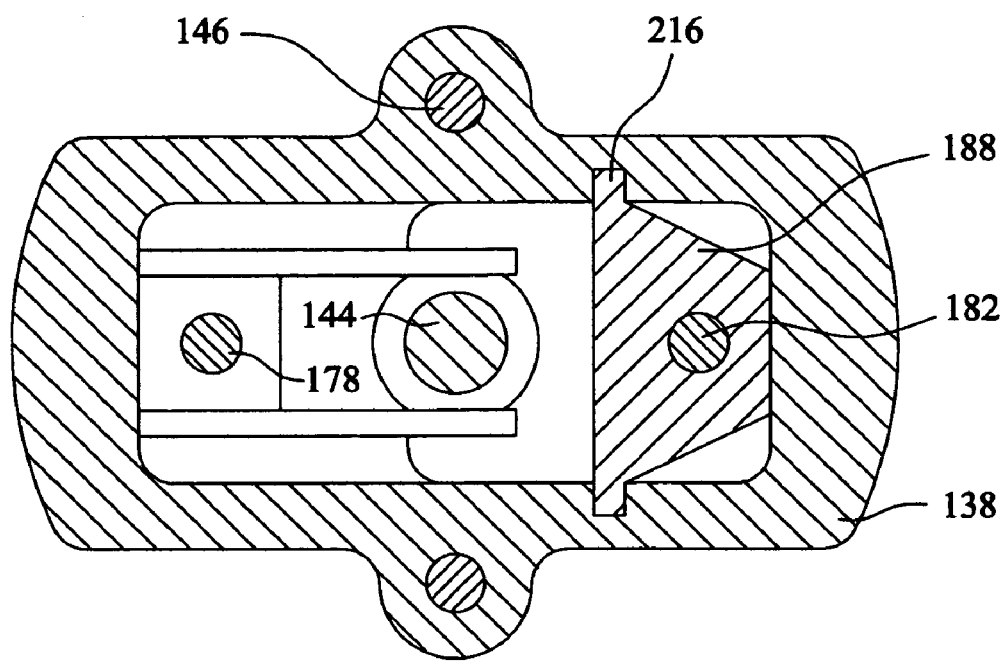
Figure 7:
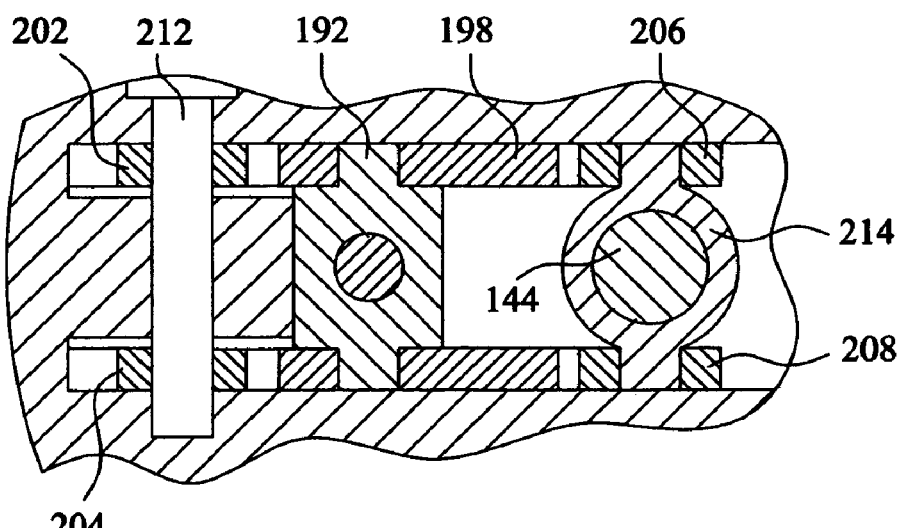
Figure 8:
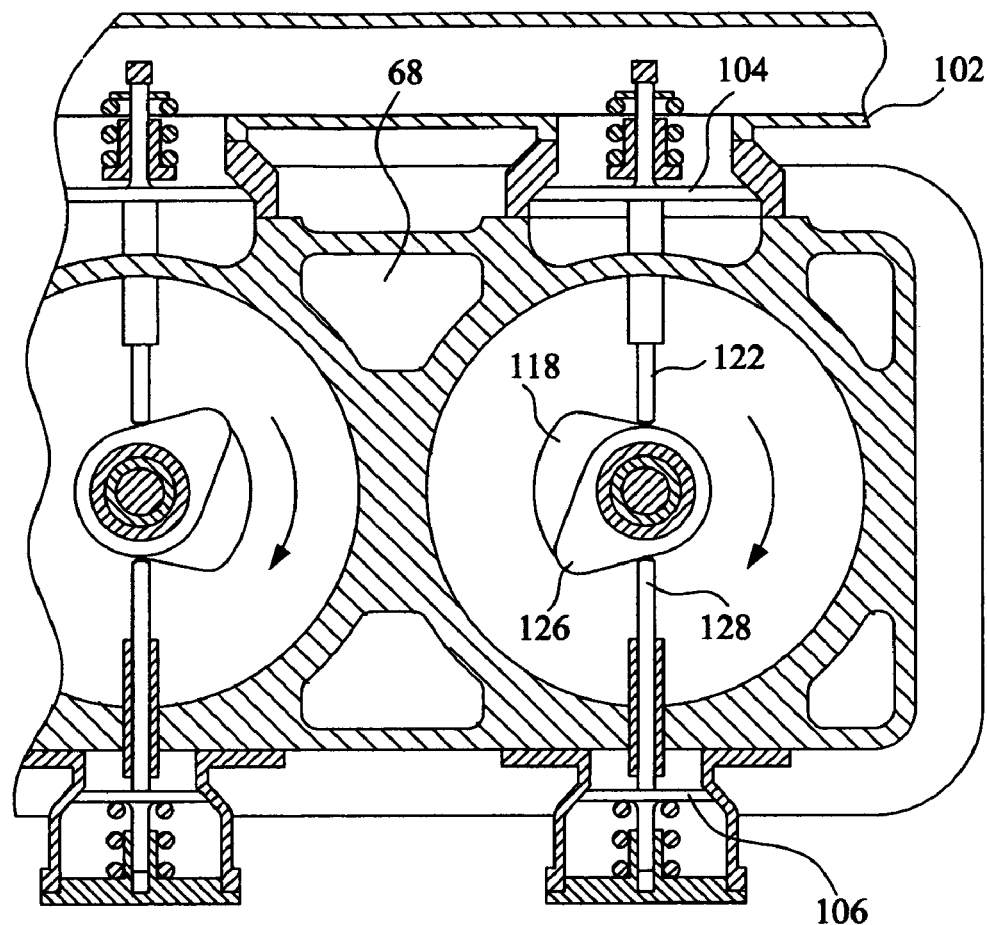
Figure 9:
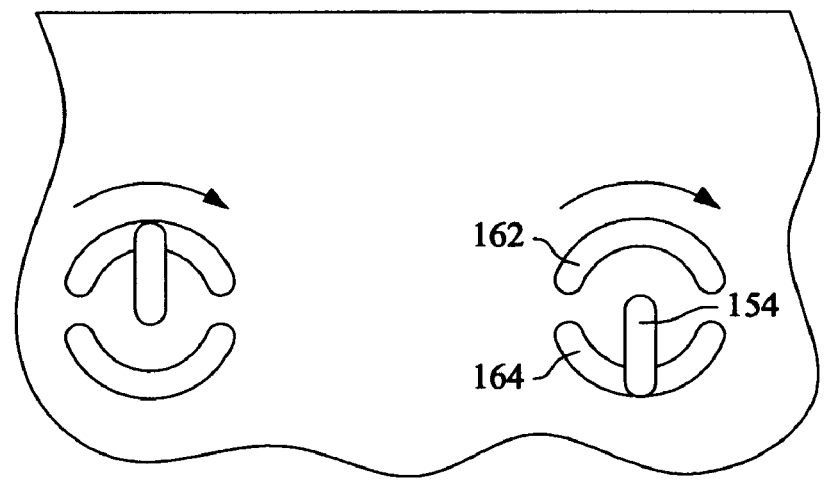
Figure 10:
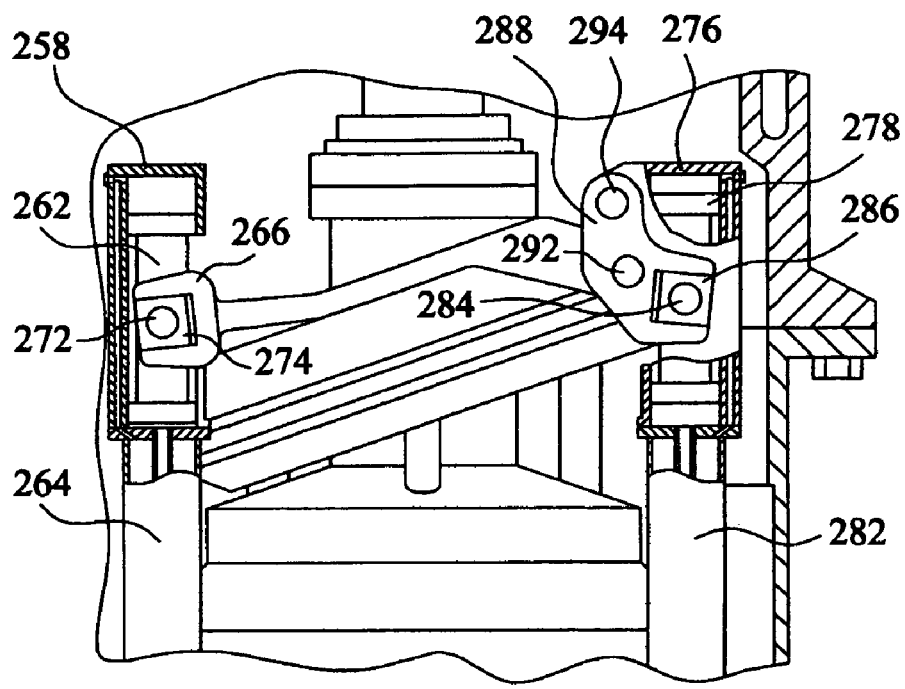
Figure 11:
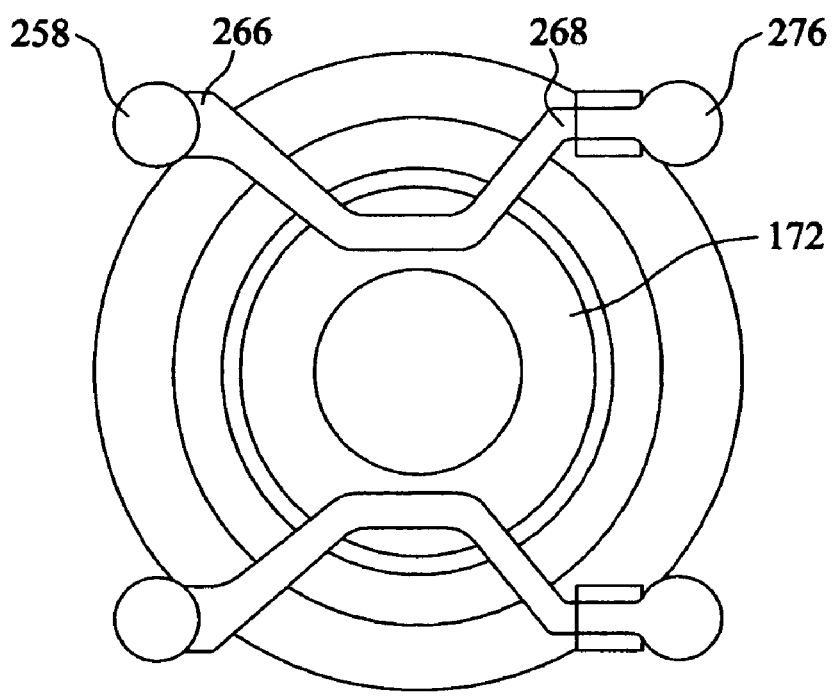
Figure 12:
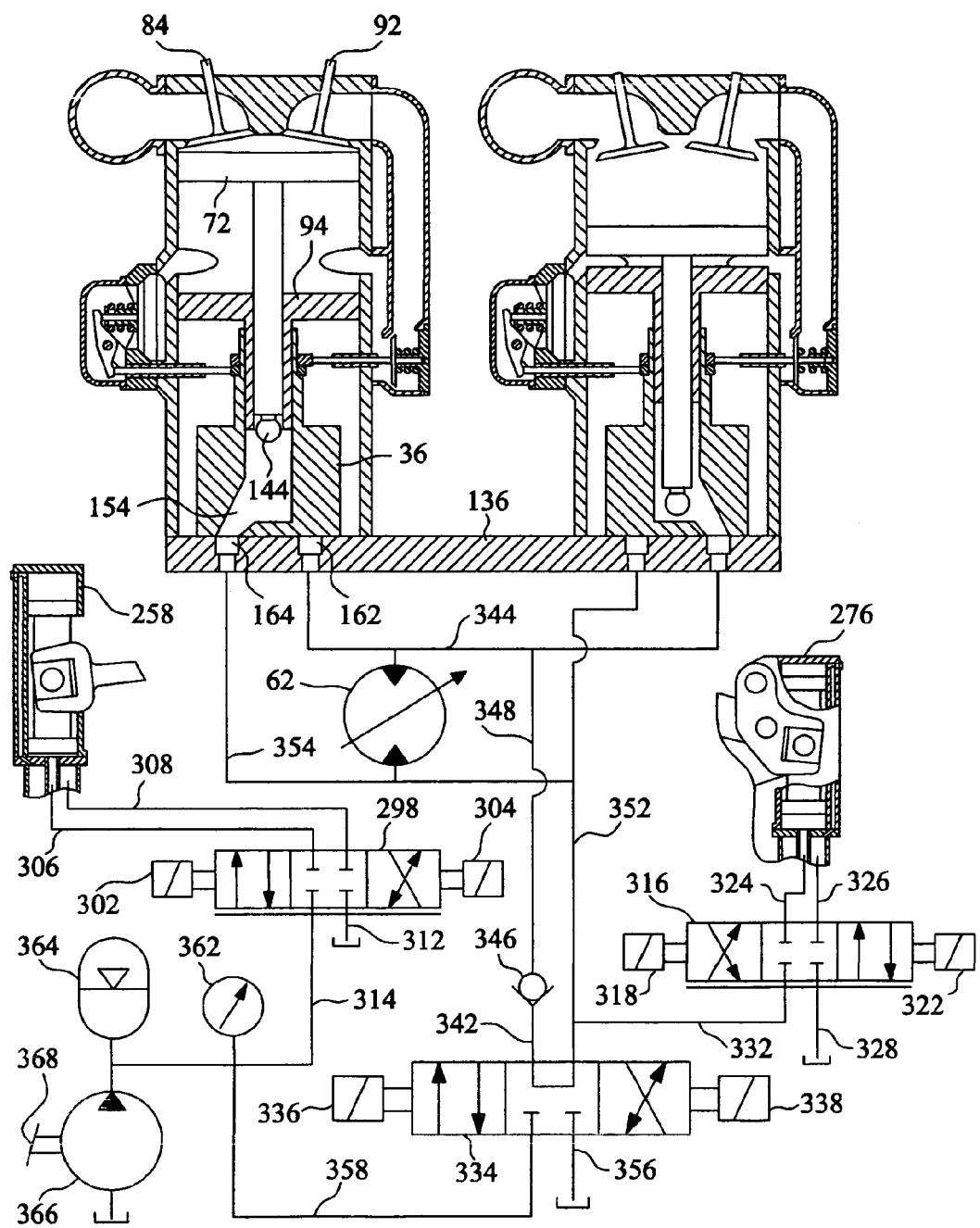

FIG. 1 shows a preferred embodiment of the two cylinders universal hybrid in accordance with the principles of the present invention;

FIG. 2 shows a section along the one cylinder axis of the present invention;

FIG. 3 shows a section along the two cylinders axis of the present invention;

FIG. 4 shows a section along the axial rods axis of the synchronize mechanism of the present invention;

FIG. 5 is a view in detail of the portion indicated by the section lines 1-1 in FIG. 4;

FIG. 6 is a view in detail of the portion indicated by the section lines 2-2 in FIG. 4;

FIG. 7 shows a section along the lever of the synchronize mechanism of the present invention;

FIG. 8 shows a cross section of cylinders with the compressor valves of the present invention;

FIG. 9 shows a section along the valve plate of the present invention;

FIG. 10 is a front view of the swash plate turn mechanism and swash plate turn axis shift mechanism of the present invention;

FIG. 11 is a plan of the swash plate turn mechanism and swash plate turn axis shift mechanism of the present invention;

FIG. 12 shows a hydraulic diagram of the present invention;

FIGS. 13A to 13D show an operating sequence of hybrid of the present invention.

Figure 14A:
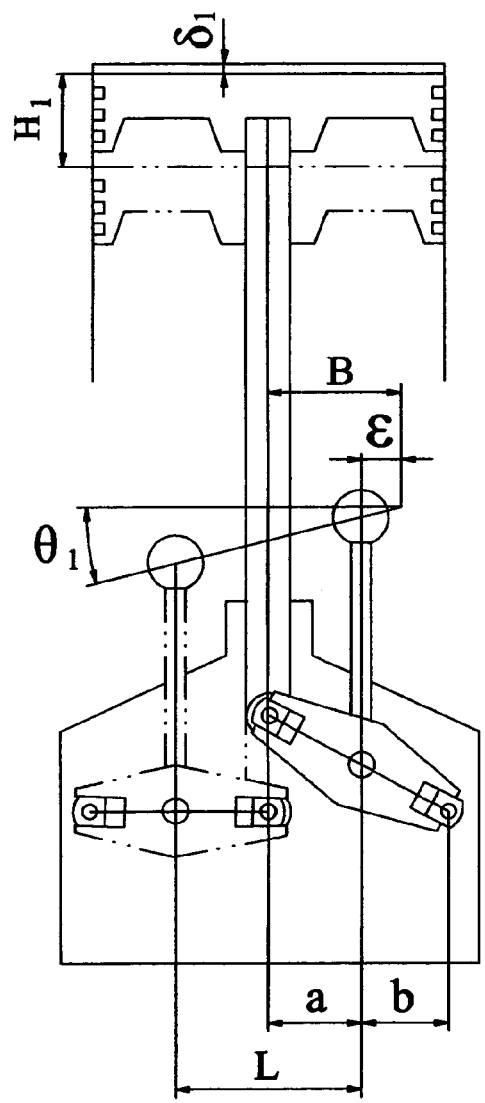
Figure 14B:
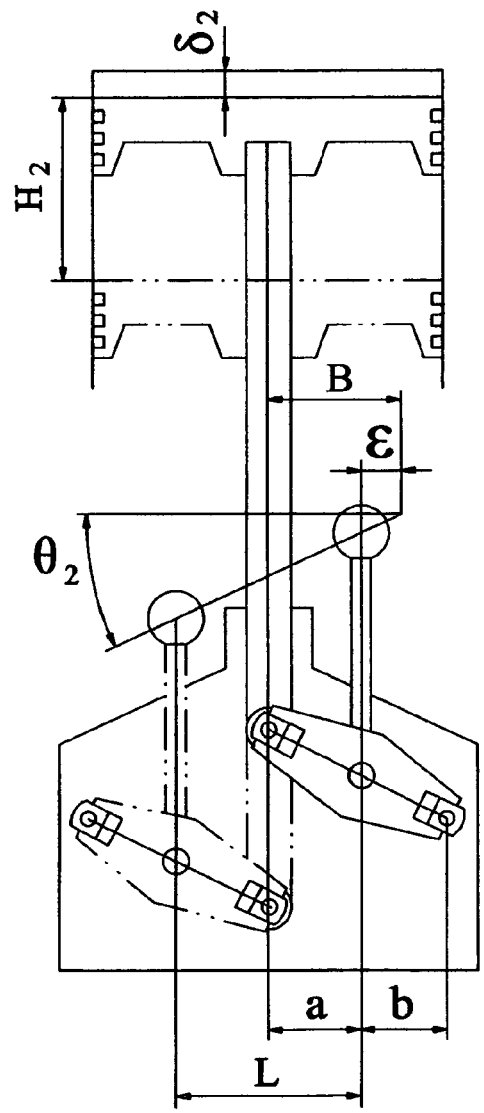
Figure 15A:
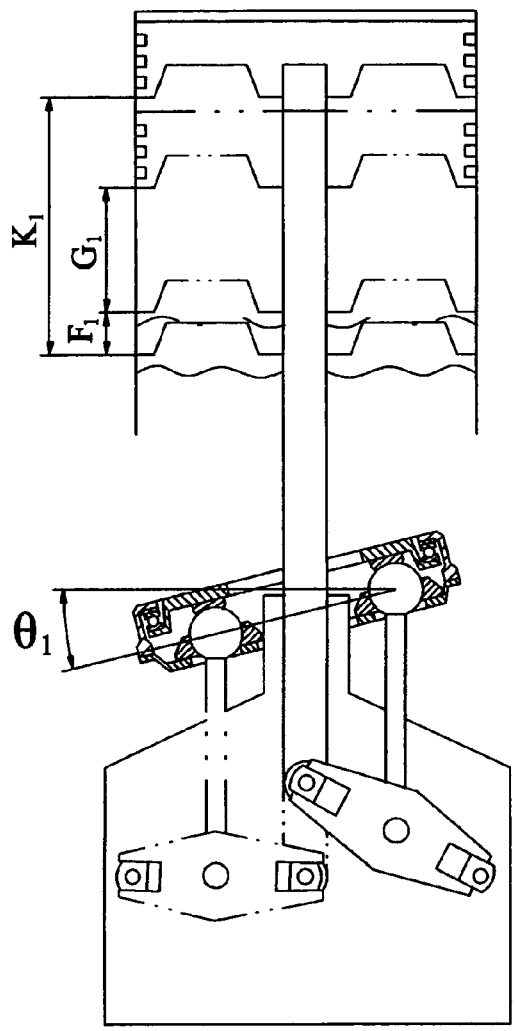
Figure 15B:
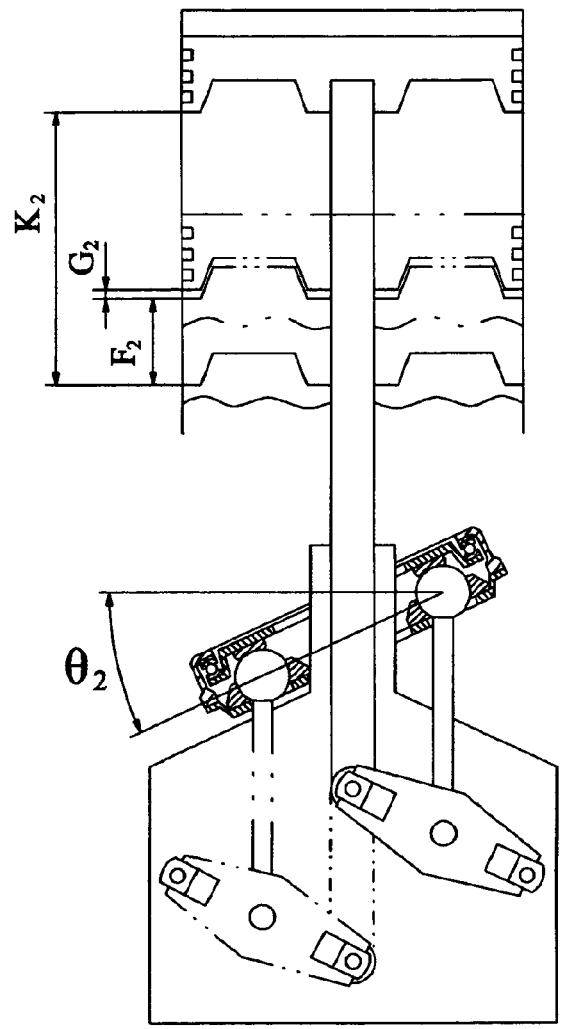

FIG. 14A is a kinematical diagram, which shows minimum engine displacement volume of the universal hybrid of the present invention;

FIG. 14B is a kinematical diagram, which shows maximum engine displacement volume of the universal hybrid of the present invention;

FIG. 15A is a kinematical diagram, which shows minimum engine, compressor and pump displacement volume of the universal hybrid of the present invention;

FIG. 15B is a kinematical diagram, which shows maximum engine, compressor and pump displacement volume of the universal hybrid of the present invention;

The same reference numerals refer to the same parts through the various figures.

DRAWINGS—REFERENCE NUMERALS 26 universal hybrid
28 engine
32 compressor
34 pump
36 rotor
38 synchronize mechanism
42 swash plate
44 reducer
46 conic reducer
48 swash plate turn mechanism
52 swash plate turn axis shift mechanism
54 swash plate turn hydraulic system
56 swash plate turn axis shift hydraulic system
58 hydraulic control system
62 hydraulic motor
66 engine modular cylinder block
68 engine cooling system
72 engine piston
74 engine piston rings
76 engine cylinder head
78 combustion chamber
82 engine camshaft
84 exhaust valve
86 exhaust manifold
88 compressor chamber
92 air injection valve
94 compressor piston
96 compressor piston rings
98 hub
102 compressor intake manifold
104 compressor intake valve
106 compressor output valve
108, 112 springs
114 receiver
116 water jacket of receiver
118 lobe
122 rod
124 rocker
126 lobe
128 rod
134 pump housing
136 valve plate
138 pump cylinder block
142 abutment
144 plunger
146 pump piston
148 pump piston shoe
152 pump chamber
154 canal of rotor
156 bearing of rotor
158 spring of rotor
162, 164 slots
72 swash plate disk
174 bearing of swash plate
176 plate
178, 182 axial rods 184 shoe
186 washer-shoe
188 holder
192 pin-holder
194, 196 compensate pistons
198 lever
202,204,206,208 sliders
212 axle
214 crossbar
216 ledge
218 guide groove
222 disc spring
224,226,228 gearwheels
232 bearing of reducer
234,236,238 shafts of reducer
242, 244 toothed clutches
246 conic reducer inlet shaft
248 intermediate shaft
252 conic reducer outlet shaft
254 pulley
256 belt
258 servo cylinder
262 servo piston
264 prop
266 fork of swash plate
268 ear
272 axle
274 slider
276 servo cylinder
278 servo piston
282 prop
284 pin
286 slider
288 lever
292 hinge pin
294 shaft
298 hydraulic distributor
302,304 solenoids
306,308,312,314 hydraulic lines
316 hydraulic distributor
318, 322 solenoids
324,326,328,332 hydraulic lines
334 hydraulic distributor
336,338 solenoids
342,344 hydraulic lines
346 check valve
348,352,354,356,358 hydraulic lines
362 electric manometer
364 pneumohydraulic accumulator
366 starter pump
368 pedal of starter pump

DETAILED DESCRIPTION

With reference now to the drawings, and in particular, to FIGS. 1 through 15 thereof, the preferred embodiment of the new and improved hybrid embodying the principles and concepts of the present invention will be described.

Specifically, it will be noted in the various Figures that the device relates to a universal hybrid for providing increased efficiency and specific power while minimizing the weight, and fuel consumption, necessary in particular for automobile hydrostatic transmission.

The universal hybrid 26 (FIG. 1) is comprised of a two-cycle engine 28 compressor 32, pump 34 with rotor 36, synchronize mechanism 38 with a pivotable swash plate 42, reducer 44, conic reducer 46, swash plate turn mechanism 48 and the distance between rotor centerline and the swash plate turn axis change mechanism 52 (which we shall refer to simply as "swash plate turn axis shift mechanism"), conventional accessory units, swash plate turn hydraulic system 54, swash plate turn axis shift hydraulic system 56 and hydraulic control system 58 associated with a conventional hydraulic motor 62 (FIG. 12). The conventional accessory units not illustrated.

The engine 28 is comprised of a modular cylinder block 66 (FIG. 2) with cooling system 68, piston 72 with rings 74, modular cylinder head 76 with combustion chamber 78, camshaft 82, exhaust valve 84 and exhaust manifold 86. the engine piston located between the compressor chamber 88 and combustion chamber, is comprised of an air injection valve 92.

The compressor is comprised of a piston 94 (FIG. 2) with rings 96 and the compressor chamber 88 located between the engine and compressor pistons within the engine cylinder. The compressor piston fastened to a hub 98. The compressor is comprised of an intake manifold 102, intake and output valves 104, 106 with springs 108, 112, which are located on the side surface of engine cylinder. The output valve is coupled with the air injection valve of the engine by a receiver 114, which is comprised of a water jacket 116 and is located on the side surface of engine cylinder. The compressor intake valve is connected with the one lobe 118 (FIG. 2,8) by means of rod 122 and pivotably mounted rocker 124. The compressor output valve is connected with the second lobe 126 by rod 128 and both lobes fastened to pump's rotor.

The pump is comprised of modular housing 134 (FIG. 2), joined to the engine cylinder block and joined to a valve plate 136. A pump's rotor is comprised of a cylinder block 138 fastened to an abutment 142 and a plunger 144 fastened to the engine piston. The rotor comprises a pump pistons 146 with shoes 148, chamber 152 with a canal 154 (FIG. 3,9) and the plunger, rotor, compressor piston, hub are located coaxially. The rotor is coupled with the pump housing by a bearing 156 with a spring 158. The valve plate connected to each rotor by a pump inlet and outlet slots 162, 164 (FIG. 2, 9) forming the circumference, coupled with the pump chamber by the rotor canal 154 and fluidly connected with pump pistons. The pump associated with the hydrostatic transmission conventional motor by pump outlet and inlet lines.

The synchronize mechanism is comprised of swash plate 42 (FIG. 1) consisting of disk 172 (FIG. 3), bearing 174 and plate 176 (FIG. 4), two diametrically opposite axial rods 178, 182 with spherical and cylindrical ends, shoes 184 and washer-shoes 186, holder 188 and pin-holder 192, compensate pistons 194, 196, lever 198 with sliders 202, 204, 206, 208 (FIG. 7), axle 212, crossbar 214 and hub 98.

An axial rod's spherical ends coupled both with the disk and plate of the swash plate respective by diametrically opposite shoes and washer-shoes outside of the rotor. The first axial rod's 178 (FIG. 3,4) cylindrical end coupled with the pump plunger and one compensate piston 194 by means of the pin holder 192 and lever 198. The lever is pivotably coupled with the rotor by axle 212 (FIG. 7) and sliders 202, 204 and pivotably coupled with the pump's plunger by sliders 206, 208 and crossbar 214 and pivotably coupled with the first axial rod by means of pin-holder 192.

The second diametrically opposite axial rod's 182 cylindrical end coupled with the compressor piston and second compensate piston 196 by means of the hub 98 pivotably connected with holder 188. The holder connected with rotor by means of ledges 216 (FIG. 5) mounted within rotor's guide grooves 218 (FIG. 4).

The disk 172 (FIG. 4) by bearing 174 and disc spring 222 is coupled with the plate 176 and simultaneously associated with the pump's valve plate by swash plate turn mechanism and swash plate turn axis shift mechanism.

The reducer case is the valve plate 136 (FIG. 3) and is comprised of gearwheels 224, 226, 228, hearings 232 and shafts 234, 236, 238, which are connected to the rotors by toothed clutches 242, 244 and with the conic reducer's inlet shaft 246 (FIG. 1) by the intermediate shaft 248.

The conic reducer's outlet shaft 252 (FIG. 1) is coupled with the engine camshaft and pulley 254, which coupled with the belt 256.

The swash plate turn mechanism is comprised servo cylinder 258 (FIG. 10,11) with servo piston 262, and coaxially piping prop 264. The swash plate disk 172 comprised a fork 266 and ear 268. The fork coupled with piston by axle 272 and sliders 274. The servo cylinder by means of prop connected to valve plate.

The swash plate turn axis shift mechanism is comprised of a servo cylinder 276 (FIG. 10,11) with servo piston 278, coaxially piping prop 282 The servo piston is coupled with the swash plate ear 268 by means of pin 284 with slider 286, lever 288 and hinge pin 292 connecting the ear and lever. The lever coupled with the servo cylinder by means of shaft 294 and the prop is a coaxially piping and fastened to the valve plate.

The swash plate turn hydraulic system comprised of a hydraulic distributor 298 (FIG. 12) with solenoids 302, 304. The distributor first and second lines 306, 308 is connected with the servo cylinder by means of prop, third line 312 coupled with the tank and the fourth line 314 of the distributor is associated with the hydraulic control system.

The swash plate turn axis shift hydraulic system comprised of a hydraulic distributor 316 (FIG. 12) with solenoids 318, 322. The distributor first and second lines 324, 326 is connected with the servo cylinder by means of prop, third line 328 is coupled with the tank and the fourth line 332 of the distributor is associated with the hydraulic control system.

The hydraulic control system is comprised of the hydraulic distributor 334 (FIG. 12) with solenoids 336, 338. The first line 342 of the distributor is connected with the pumps' inlet line 344 by the check valve 346 and line 348; the second line 352 is coupled with the pumps' outlet line 354; the third line 356 coupled with the tank; and the fourth line 358 of the distributor is coupled with the electric manometer 362, pneumohydraulic accumulator (PHA) 364 and the starter pump 366, which comprises of the pedal 368. The line 358 coupled with the line 314 of the swash plate turn hydraulic system. The line 352 is coupled with the line 332 of the distributor 316.

The accessory regular units (not illustrated)—cooling system pump, electric system generator, steering pump, associated with the belt.

As to the manner of usage and operation of the present invention, the same should be apparent from the above description.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

Description of Operation

The universal hybrid has starting, restarting, starting by muscle effort, idling, work and pneumohydraulic accumulator (PHA) charging mode of operation. The operator initiates the start. Switching from start to idle mode is automatic. The work mode is initiated automatically after the accelerator pedal (not illustrated) is depressed. The PHA also is charged automatically. The starting and idling mode occurs with smaller displacement volume of the engine, pump and compressor. The work mode occurs with automatically variable displacement volume of the engine, pump and compressor determined by means of the swash plate angle incline and controlled by the computer (not illustrated). This control provides the engine operation with minimum specific fuel consumption. The engine can use either kind of fuel in accordance with the swash plate turn axis disposition.

Starting Mode

The operator switches on the solenoid 336 (FIG. 12) by key ignition (not illustrated). The distributor 334 switches from neutral to the "start" position and connects the lines 358 with 342 and 356 with 352. Because the solenoid 336 associated electrical (not illustrated) with solenoid 302 simultaneously the distributor 298 switches to the "start" position and connects the lines 306 with 314 and 308 with 312. The servo cylinder 258 provides the swash plate angle and the engine, pump and compressor displacement volume minimum in accordance with the minimum engine load.

During the starting process high pressure fluid goes from the PHA 364 by the lines 358, 342, 348, 344 via the distributor 334 and valve 346 to the pump inlet of separate cylinders in turn. The fluid goes from pump outlet of separate cylinders in turn via the lines 354, 352, 356 and distributor 334 to the tank without load.

The plunger moves from bottom end position (BEP) to top end position (TEP) and by crossbar 214 (FIG. 2) with sliders 206, 208 (FIG. 7) rotates the lever 198. The lever with sliders 202, 204 rotates relatively to axle 212 and moves the pin-holder 192 with axial rod 178 (FIG. 4) to TEP position. The interaction of the shoe 184 with the swash plate disk 172 rotates the rotor. The pump's pistons 146 jointly with the plunger rotate the rotor by means of interaction shoes 148 with the swash plate disk 172. So the rotor with pistons works in hydraulic motor mode during the starting process. The direction of rotors rotation shows the arrows (FIG. 8,9) and the rotor canals shows schematic.

The reducer 44 (FIG. 1) by shafts 234, 236, 238 (FIG. 3) with gearwheels 224, 226, 228, intermediate shaft 248 with conic reducer 46 and belt 256 activate the other rotor, the engine and compressor camshafts and conventional accessory units (not illustrated): cooling system pump, electric system generator, replenishing pump of hydrostatic transmission. The other rotor pistons works in the hydraulic motor mode during the starting process and jointly with the first rotor pistons decreases the power flow via the reducer 44.

The reducer with synchronize mechanism provides the piston-plunger movement from BEP to TEP in one rotor and simultaneously the piston-plunger movement from TEP to BEP of the other rotor, because the second rotor is set up with phase shift at 180 degrees.

The FIG. 3 illustrates the rotors' orientation and the FIG. 9 shows the rotor canals disposition with phase shift of 180 degrees.

Within one cylinder, during one half revolution, while the rotor canal connects with the pump inlet slot, the outlet slot is closed. During the second half revolution, while the rotor canal connects with the pump outlet slot, the inlet slot is closed.

The separate cylinder pumps' fluid flow communication provides simultaneous connection of the first rotor canal with the outlet slot and of the second rotor canal with the inlet slot with smoother fluid flow.

Such sequences occur in the all the operating modes.

Thus, the separate cylinder pumps in mode of hydraulic cylinder work in turn and provide the engine start up by using the PHA high pressurized fluid with high efficiency.

The engine piston compresses the air in the combustion chamber, and conventional fuel injection (not illustrated) initiates the power stroke of the engine.

Thus operates a high-power hydraulic starter. The starter is able to fast start and restart the engine and enables us to replace the conventional electric starter motor and the alternator. The high pressure fluid enables a quiet starting process to occur, and also enables an engine to shut down at every red traffic light with decreased fuel consumption. This is very valuable in particular for automobiles' hydrostatic transmission.

In starting mode the compensate pistons 194, 196 (FIG. 3) considerably decrease the forces pressing the axial rods against the swash plate, because the compensate pistons and axial rods interact within the pump chamber by opposite forces. Moreover, the start process occurs with the engine, compressor and pump minimum displacement volume. All these factors combine provides the engine with a light start.

If the fluid pressure in the PHA is not sufficient (the electric manometer 362 shows fluid pressure value) the starter pump 366 with the pedal 368 provide an opportunity to increase fluid pressure with muscle efforts. Thus, the hydraulic system enables one to start the engine independent of any external energy sources such as an electric battery, for example, thus providing the autonomous work of a hybrid and engine start, irrespective of parking time.

Idling Mode

The rotor angular velocity increases after the start up. A speed sensor (not illustrated) switches off the solenoid 336, and the distributor 334 in the neutral, "idling," position connects the line 342 with 352. The lines 358, 356 are closed. The engine automatically switches from starting mode to idling mode but the distributor 298 position doesn't change and provides the idling mode with minimum displacement volume of the engine, pump and compressor in accordance with the minimum engine load.

The fluid flow in accordance with the pump volume minimum circulates from the pump outlet to the pump inlet via the lines 354, 352, 342, 348, 344, distributor 334 and valve 346 with minimum power.

The rotor's pistons works in hydraulic pump mode and jointly with pump plungers provides the smoother power flow during the idling process.

Thus during the idling process fluid goes from the pump outlet, but during the starting process high pressurized fluid goes from the PHA to the pump inlet.

Figure 13A:
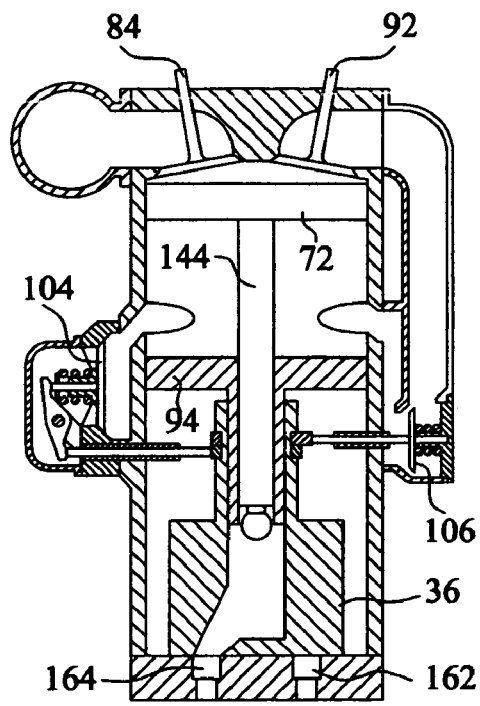

The energy of combustion pressure is transmitted to the piston-plunger during its movement from the TEP to BEP. This process is illustrated in FIG. 13A. The engine valves 84, 92 are closed. The compressor intake valve 104 is closed and the output valve 106 is open.

The piston-plunger assisted by the crossbar 214, (FIG. 2, 7) the sliders 206,208 (FIG. 7) and the lever 198 moves the axial rod 178 (FIG. 4) also downward, from the TEP to BEP. The interaction of the washer-shoe 186 with the swash plate rotates one rotor and assisted by the reducer 44 activates the second rotor and moves the engine piston of the second cylinder upward, from BEP to TEP. The direction of rotors rotation shows the arrows (FIG. 8, 9).

The crossbar rotates together with the rotor relative to the plunger sphere, and is actually a bearing, because the plunger is not rotating. Simultaneously the axial rod 182 activates the compressor piston movement from BEP to TEP, assisted by holder 188 and hub 98, which actually a bearing because the compressor piston is not rotating.

So each axial rod double-sided interacted with the pivotable swash plate by means of shoe and washer-shoe. The double-sided interaction without clearance provides disc spring 222 of the initial compressive stress. Thus the synchronize mechanism transforms the reciprocating movement of the piston-plunger into rotor rotation, and provides the opposite movement of engine and compressor pistons. This mechanism functions as the in—cylinder synchronize mechanism.

The movement of all components of the synchronize mechanism in oil within pump chamber provides high quality lubrication and increase the efficiency.

The synchronize mechanism and the reducer 44 transfer the engine power stroke, compression stroke of compressor and power stroke of pump plunger in one cylinder, to the simultaneous compression stroke of engine piston and suction strokes of compressor and pump in the other cylinder and also activate the accessory system of the universal hybrid.

The reducer, connecting the rotors, is the inter cylinder synchronize mechanism.

The compressor piston and push rod have equal strokes. The lever gives the piston-plunger an increased stroke, in accordance with the lever ratio.

Thus the opposing movement of the compressor and the engine pistons allows the space under the engine piston to function as chamber of the compressor. This ensures, that the noise is decreased, because static energy is used, that is air pressure, instead of air high speed, i.e. kinetic energy as in a conventional blower. Because the pistons are moving in opposing directions, the engine piston becomes in essence a compressor piston. This results in direct energy transmission for air compression, and provides increased efficiency.

The opposing movement provides simple and high-quality balancing of the system because the compressor piston compensates for the inertial forces influencing the engine piston with plunger. This decreases the vibration.

The idling mode continues as long as the accelerator pedal is not depressed.

Work Mode

The accelerator pedal (not illustrated) depression increases the rotor angular velocity and a speed sensor (not illustrated) switches on the solenoid 338 (FIG. 12). The distributor 334 automatically switches from idling to the "work" position and connects the lines 358 with 352 and 342 with 356.

The distributor 298 by means of the servo cylinder 258 realizes the automatic control of the swash plate angle and provides the variable displacement volume of the engine, compressor and pump in accordance with the engine load.

This automatic control occurs by means of signals from the automotive on-board computer (not illustrated) and provides the work mode with minimum specific fuel consumption. This also enables the engine power to adapt to wider variable load and speed range of an automotive and creates a more environmentally—friendly internal combustion engine.

The FIGS. 13A, 13B, 13C, 13D illustrates the hybrid operating sequence during a single revolution of the rotor.

The FIG. 13A shows the piston-plunger power stroke and simultaneously the compressor piston power stroke with motion in opposite directions. The engine valves are closed, the compressor output valve are open and the intake valve is closed. The pressurized fluid flow goes from the pump chamber to pump outlet.

The energy of combustion pressure is transmitted to the piston-plunger during its movement from the TEP to the BEP during a half revolution of the rotor.

The greatest part of the power flow is the integrated from plungers and rotor's pistons high pressure fluid flow, which goes from the pump outlets alternately.

The simultaneous motion of the upper portion of the pump plunger into the compressor chamber, and the lower portion of the plunger within both the hub of the compressor piston and the rotor provides direct energy transmission. This allows use of one simple unit hybrid instead of two complicated and heavy regular units (an engine and a pump). Also the universal hybrid solves the problem of using reciprocating engine and compressor without a crankshaft or connecting rods. This increases efficiency and decreases fuel consumption.

The compensate pistons 194, 196 (FIG. 3, 4) interact with axial rods in the pump chamber, reducing the forces which press the axial rods against the swash plate. This increases both the efficiency and the rotor rotation speed. The pump plunger disposition on the rotor's centerline allows a considerable increase in rotor speed rotation and transmission power in comparison with a conventional pump.

All these factors enable us to increase the pump transmission power flow to equal the maximum engine power.

The second, and much smaller, part of the power flow uses the interaction of the underside of the engine piston with the compressor piston to compress air in the compressor chamber and in the air receiver 114 (FIG. 2). The compressor piston motion is provided by fluid pressure on the hub 98 in the pump chamber 152 simultaneously with the pump power stroke, without cross forces. The air compression with direct energy transmission by means of pump plunger increases efficiency and decreases fuel consumption. The additional air cooling (intercooling) by the receiver water jacket 116 increases the engine thermal efficiency and decreases fuel consumption.

The third and smallest part of the power flow is transmitted to the second rotor by reducer 44. The synchronize mechanism of the second rotor activates the pistons: the compressor piston moves to BEP and the engine piston moves to TEP within the second cylinder. This smallest part of the power flow compresses the air in the combustion chamber, suctions the air in the compressor chamber, intakes the fluid in the pump chamber in the second cylinder.

The location of the piston-plunger (inside the cylinder and simultaneously inside the hub 98) and the absence of cross forces as it moves, allow the engine piston length to be minimized. The location of the compressor piston and the hub (simultaneously within the cylinder and the rotor) allows the compressor piston length to be minimized. This provides a compact design, minimizes piston mass and forces of inertia.

In work mode, the synchronize mechanism provides movement of the compressor piston and the rotation of the rotor, in synchronization with the piston-plunger movement, irrespective of the engine load or rate of acceleration.

Thus within each cylinder, the power strokes of the engine, pump and compressor are taking place simultaneously, with direct energy transfer, without any intermediate mechanisms, without a cross force influence from the pistons or the plunger and without yoke mechanism. This simplifies the design, and increases the longevity and the efficiency of the universal hybrid.

In the universal hybrid, the weight and installation space are smaller than in the conventional system engine-pump thanks to the direct energy transmission.

The working sequence in the separate cylinder components is determined by the reducer, which connects the rotors. This operation sequence increases the pumps' flow stability.

Together with the inter cylinder synchronizing function the reducer also activates the engine camshaft, via a conic reducer 46.

The rotors pistons works in the hydraulic pump mode and jointly with pump plungers provides the smoother fluid flow.

The synchronize mechanism provides the engine and compressor valves with motion, with consequent performance in compliance with a two-stroke working cycle; and each engine piston stroke from TEP to BEP is a power stroke. The piston-plunger in BEP and the compressor piston in TEP simultaneously complete their power stroke. Air is compressed in the receiver to maximum pressure.

The pistons' opposing movement provides a compressor displacement volume greater than the volume of the engine, because it is formed by the superposition of the motions of the engine and compressor pistons. This increases air mass intake and specific power of the engine.

Because of its location on the side surface of the cylinder, the compressor intake valve diameter can be made much larger than the intake valve of a regular engine, with equal displacement volume. This larger intake valve provides the greater compressor displacement volume operation.

The intake air is cooler because it does not pass through the combustion chamber as with a conventional engine. This increases volumetric efficiency and air mass in the compressor chamber. Such joint factors improve the engine operation in all conditions and particular at low atmospheric pressure, for example, high above sea level.

The compressor's valve cams fixed to the rotor provides the modular engine block with a smaller weight, installation space, cost and labor.

The engine piston movement from BEP to TEP is comprised of three successive processes: combined clearing, joint compression, and finish compression (of the air in case of diesel, or of the mixture in case of gasoline engine) by the engine piston.

Figure 13B:
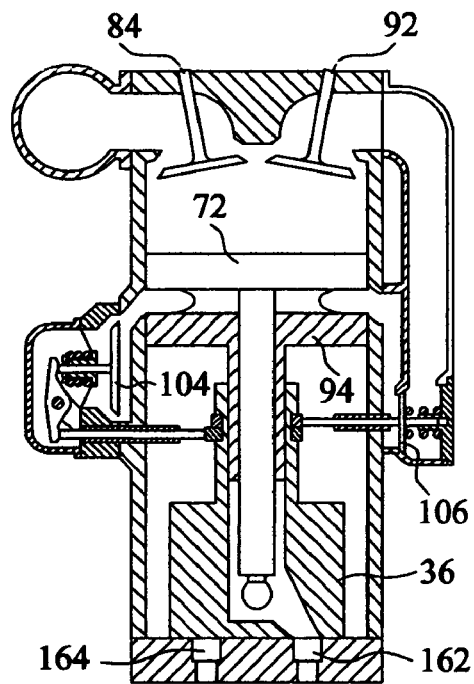

The combined clearing process is shown in the FIG. 13B.

There are three factors in the clearing process.

The valves 84, 92 are open. The piston-plunger moves from BEP to TEP (the first factor) and, simultaneously, high pressurized air, injected from the receiver through the open valve 92 and displaces the burned gases through the open valve 84 (the second factor). The clearing process provides the super high-pressurized air, which was compressed in the previous stroke while the engine piston moved downward.

This combined action intensifies the exhaust process and increases the volumetric efficiency. The additional cooling (intercooling) of air by the water jacket of the receiver is the third factor. Thus the three joint factors improve the exhaust process and increase the specific power of the engine. The combined clearing process ends when the exhaust valve is closed.

Figure 13C:
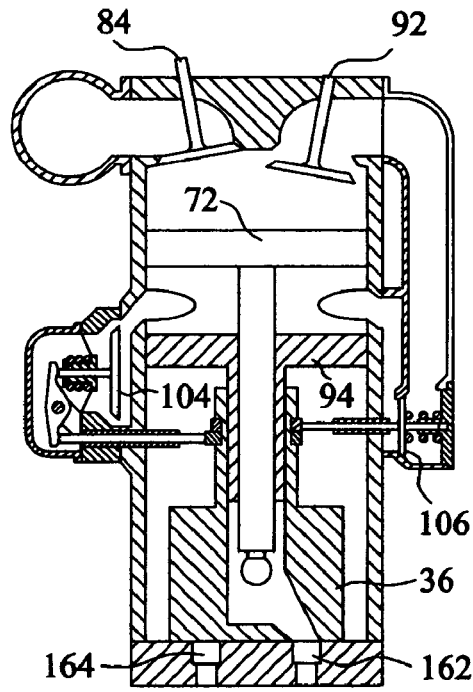

The joint compression process is shown in the FIG. 13C.

The exhaust valve 84 is closed and the air injection valve 92 is open. The engine piston continues movement, and, jointly with the air injection, increases air pressure in the cylinder because the air pressure within the receiver is greater than that within the combustion chamber. The joint compression process ends when the injection valve is closed.

Figure 13D:
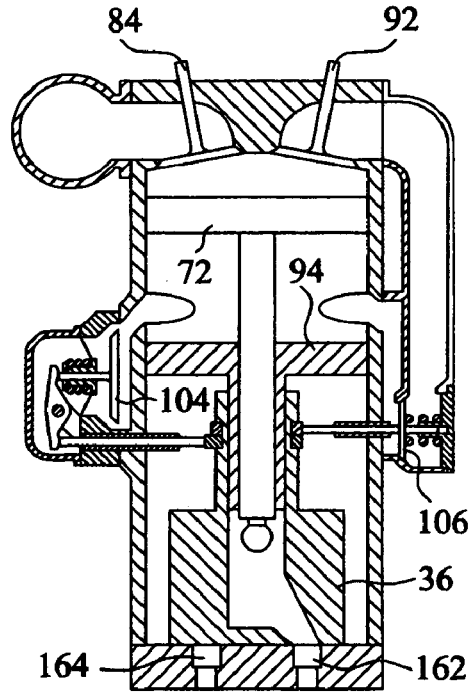

The finish compression process is shown in the FIG. 13D.

The valves 84, 92 are closed. The engine piston continues compression. Before TEP, the pressure in the cylinder becomes the maximum magnitude. A conventional fuel injection system (not illustrated) provides the start of the engine power stroke. The working cycle ends after one rotor revolution.

Thus the two-cycle engine of the universal hybrid uses a widely available and inexpensive four-cycle engine cylinder head, with the intake valve functioning as an air injection valve. This valve replaces the conventional two cycle engine cylinder wall air ports, and improves the two cycle engine operation. This solves the problem of boosting the two-cycle engine power by super high pressurized air injection.

The engine, compressor and pump operation is the function of the two independent arguments: first—the swash plate angle, second—the distance between the rotor centerline and the swash plate turn axis. The first argument determines the engine, compressor and pump displacement volume. The second argument determines the engine compression ratio.

The widely known engine compression ratio determines the kind of fuel (fuel octane rate) and determines a very important requirement: the engine compression ratio must be independent of the engine displacement volume change while the engine operates with the given fuel.

This requirement executes in full the universal hybrid synchronize mechanism in accordance with the next proof.

The proof of the engine displacement volume changing independent of the engine compression ratio (see FIG. 14A, 14B).

The universal hybrid compressor piston stroke h per half rotor revolution is equal to the axial rod stroke and in accordance with the widely know axial mechanism is $$h = L \tan \Theta \quad (1)$$

where L is the distance between axial rod axis $\Theta$ is the swash plate angle The engine piston stroke H greater than the compressor piston stroke h in accordance with the lever ratio $i=(a+b)/b$ where a,b is the lever arms $$H = ih = iL \tan \Theta \quad (2)$$

The widely now engine compression ratio $\Lambda$ is $$\Lambda = (\delta + H)/\delta \quad (3)$$

where $\delta$ is the engine piston clearance

Let's the swash plate turn axis dispose on the line connecting an axial rod sphere centers.

If $\Theta = 0$: $H = 0$ and $\delta = 0$ \quad (4)

The engine piston clearance $\delta$ is $$\delta = i \epsilon \tan \Theta \quad (5)$$

here $\epsilon$ is the distance between the axial rod axis and the swash plate turn axis The equations (2),(3),(4) and (5) gives the engine compression ratio.

$$\Lambda = 1 + L/\epsilon \quad (6)$$

$$\text{Because } \epsilon = B - L/2 \quad (7)$$

where B is the distance between the rotor centerline and the swash plate turn axis the equations (6) and (7) gives the engine compression ratio.

$$\Lambda = (2B+L)/(2B-L) \text{ hence} \quad (8)$$

$$B = L(\Lambda+1)/2(\Lambda-1) \quad (9)$$

The proof gives us:
1. The engine compression ratio is independent of the swash plate angle $\Theta$ in accordance with equation (8). This is because both the engine piston stroke H and the clearance $\delta$ is proportional to the swash plate angle tangent (see equations 2 and 5 ). This provides the engine operation with the variable displacement volume and invariable compression ratio during the swash plate angle $\Theta$ alteration while the swash plate turn axis is fixed (B=const).
2. The engine compression ratio is dependent on the distance B between the rotor centerline and the swash plate turn axis in accordance with equation (8). This enables the different kind of fuel use and the engine transformation into an omnivorous engine by means of the distance B alteration.

The example of the distance B depending on the engine compression ratio:

Lets the engine with the distance between axial rod axis L=60 mm works with the compression ratio $\Lambda=10$ and the equation (9) gives B=36.7 mm.

Lets the other fuel requires the engine compression ratio two times greater with $\Lambda=20$ and the equation (9) gives B=33.2 mm.

This example illustrate that the distance B (between the rotor centerline and the swash plate turn axis) small change gives great engine compression ratio alteration. Also this example illustrates the effective and easy method of the engine transformation into an omnivorous engine by means of the distance B alteration.

The FIG. 14A illustrates the minimum engine displacement volume in accordance with the minimum swash plate angle $\Theta$ incline. The FIG. 14B illustrates the maximum engine displacement volume in accordance with the maximum swash plate angle $\Theta$ incline.

The swash plate turn mechanism and swash plate turn hydraulic system realizes the possibility of the engine operating with the variable displacement volume and the invariable engine compression ratio while the swash plate turn axis disposition is fixed (B=const).

The swash plate turn axis shift mechanism and swash plate turn axis shift hydraulic system realizes the possibility of the engine operating with a different kind of fuel, and the engine becomes, in essence, an omnivorous engine.

The engine, compressor and pump variable displacement volume gives the additional ability of adapting the engine power to the automotives wider variable load and speed range.

The engine, compressor and pump variable displacement volume gives the additional ability of adapting the engine power to the automotives wider variable load and speed range by means of increasing the compressor displacement volume and the air pressure magnitude simultaneously with the engine displacement volume increase.

The engine, compressor and pump variable displacement volume gives the additional ability of the engine operation with the minimum specific fuel consumption during the automotives wider variable load and speed range.

The FIG. 15A illustrates the compressor piston stroke $F_1$ and the distance between compressor and engine pistons change from $G_1$ to $K_1$ during the half rotor revolution. This distance change determines the compressor displacement volume and the compressor compression ratio in accordance with the swash plate angle $\Theta_1$ incline.

The FIG. 15B illustrates the compressor piston stroke $F_2$ and the distance between compressor and engine pistons change from $G_2$ to $K_2$ during the half rotor revolution. This distance change determines the compressor displacement volume and the compressor compression ratio in accordance with the greater swash plate angle $\Theta_2$ incline.

The FIG. 15B by comparison with the FIG. 15A illustrates the compressor displacement volume and the compressor compression ratio increase simultaneously with the swash plate angle and the engine displacement volume increase.

All these factors combine to provide use of the progressive hydrostatic transmission with variable displacement volume of the engine, compressor, pump and hydraulic motor instead of widespread automotive engine and automatic transmission, thereby minimizing the weight, installation space, cost, labor and fuel consumption.

Pneumohydraulic accumulator charge mode.

The PHA fluid pressure decreases after the start up, and the electric manometer 362 signal switches on the solenoid 338. The distributor 334 switches to the "work" position and connects the pump outlet with the hydraulic line 358. The fluid goes from the pump outlet to the PHA. The pressure increases and the electric manometer switches off the solenoid 338, while the accelerator pedal is not depressed.

Thus, after the start, the engine charges the PHA automatically. The hybrid solves the problem of charging a PHA automatically irrespective of the parking time, even if the fluid pressure is greatly decreased. In that situation, an electric manometer uses the magnitude of PHA fluid pressure as an automatic control signal, and switches the distributor solenoid instead of the previously described process of "start", "idling" and "work" (which require action by an operator). The engine fast charges the PHA and automatically switches off when fluid pressure reaches a maximum. Thus the hybrid readies the engine for next high power, fast start.

The following illustrate the approximate fuel economy of the "Universal Hybrid" use in a car with the hydrostatic transmission under city driving conditions.

| Method of the fuel economy | Rate fuel economy |
| --- | --- |
| 1. All modes operation with the minimum specific fuel consumption | 18% |
| 2. Direct energy transmission with the air intercooling supercharger | 12% |
| 3. Engine shut down at every red traffic light | 8% |
| 4. Engine and transmission lighter weight | 7% |
| 5. Energy recuperation | 30% |
| Total | 75% |

The "Universal Hybrid" with the hydrostatic transmission energy recuperation system enables us to achieve approximately 80 miles per gallon by comparison with a conventional car, 20 miles per gallon in city conditions.

The universal hybrid enables at least:

using a two cycle engine with many cylinders, with either diesel fuel or two cycle gasoline engine. In case diesel is used, a conventional system of injection pump and fuel injector into cylinder head (not illustrated) are used. In case gasoline is used, a conventional fuel injection system with spark plug into cylinder head (not illustrated) is used. In either case a conventional throttle (not illustrated) is used to control the amount of air entering the intake line of compressor using conventional fuel, cooling, electric and other accessory systems, engine starts are provided by muscle efforts independent of external energy sources. The universal hybrid ensures smaller weight and greater power then a serial system engine-pump with equal engine maximum displacement volume using the additional engine cooling by the receiver water jacket separately or jointly with the engine water cooling system, or engine cooling by air using the pressurized air in the receiver for other purposes, for example, pumping more air into the tires using with various kinds of hydrostatic transmission such as variable or fixed displacement conventional motor, closed or open loop; and providing the cylinders of machinery work equipment with high pressurized fluid using the hydraulic starter or a conventional alternator with electric starter motor (not illustrated), which activate the reducer using the installation in machinery with either orientation of the engine cylinders axis: vertical or horizontal, or the either angle using various kinds of the swash plate turn automatic system with the engine torque and rotor angle speed signal and with either kind of the feedback: electric, hydraulic or mechanically using with various kinds of gaseous fuels such as propane, natural gas, methane, hydrogen, etc. by means of simple swash plate turn axis shift mechanism using the swash plate turn axis shift mechanism with automatic or button control for the kind of fuel changing using the fuel spontaneous combustion (detonation) for more power output per displacement thanks to the direct energy transmission from engine piston to pump plunger using the pump's rotor with lobes driving a compressor's valves both the universal hybrid and invariable displacement hybrid.

Thanks to the foregoing advantages the hybrid may be used in trucks, locomotives, boats, aircraft, portable power systems, construction machinery, automobiles and other kind of the automotive and equipment.

What is claimed as being new and desired to be protected by Letters Patent of the United States is as follows:

1. An universal hybrid two-cycle engine, compressor and pump, comprising a combination of: two-cycle engine with a cylinders, pistons and camshaft, a compressor with a piston, intake and output valves, a pump with rotor comprising a plunger and a pump chamber canal, a valve plate, a synchronize mechanism with compensate pistons, axial rods and pivotable swash plate, comprising turn mechanism with hydraulic system and turn axis shift mechanism with hydraulic system, a reducer, a conic reducer, accessory units and a hydraulic control system associated with at least one hydraulic motor of hydrostatic transmission.

2. The universal hybrid of claim 1 wherein said engine camshaft located within a modular cylinder head, said cylinders located into a modular cylinder block, and said conic reducer outlet shaft coupled simultaneously with said engine camshaft and with a pulley, which by means of a belt associated with said accessory units.

3. The universal hybrid of claim 1 wherein said compressor intake valve coupled with one lobe by means of a rod and a rocker, said compressor outlet valve coupled with a second lobe by means of a rod and both lobes fastened to said pump's rotor.

4. The universal hybrid of claim 1 wherein said compressor piston coupled with said axial rod and said compensate piston by means of a hub and holder mounted by means of a ledges within rotor's guide grooves.

5. The universal hybrid of claim 1 wherein said pump comprises modular housing fastened to said modular engine cylinder block and fastened to said valve plate, and said rotor comprises a pistons with shoes mechanically coupled with said swash plate and located with a phase shift relative to said pump chamber canal.

6. The universal hybrid of claim 5 wherein said pump inlet and outlet slots associated simultaneously and fluidly with said pump chamber canal and said pistons.

7. The universal hybrid of claim 1 wherein said swash plate comprises a disc and a plate coupled both by a bearing with a disc spring and the disc comprises a fork with an ear and said axial rods spherical ends coupled simultaneously with the disc by means of shoes and with the plate by diametrically opposite washer-shoes.

8. The universal hybrid of claim 1 wherein said swash plate turn mechanism comprises a servo cylinder with piston coupled pivotably with said swash plate by means of axle and sliders and the servo cylinder fastened to said valve plate by a coaxially piping prop.

9. The universal hybrid of claim 1 wherein said swash plate turn axis shift mechanism comprises a servo cylinder with piston connected by pin and sliders to a lever coupled simultaneously with said swash plate hinge pin and by a shaft with the servo cylinder fastened to said valve plate by a coaxially piping prop.

10. The universal hybrid of claim 1 wherein said swash plate turn hydraulic system is comprises an electric hydraulic distributor with solenoids and four lines, first and second lines connected the hydraulic distributor with the servo cylinder by means of coaxially piping, the third line coupled with a tank and fourth line associated with said hydraulic control system.

11. The universal hybrid of claim 10 wherein said electric hydraulic distributor is the continuous and feedback servo with solenoids connected to computer and formed an automatic control system of said swash plate turn.

12. The universal hybrid of claim 1 wherein said swash plate turn axis shift hydraulic system comprises an electric hydraulic distributor with solenoids and four lines, first and second lines connected the hydraulic distributor with the servo cylinder by means of coaxially piping, the third line coupled with a tank and fourth line associated with said hydraulic control system.

13. The universal hybrid of claim 12 wherein said electric hydraulic distributor is the continuous and feedback servo with solenoids connected to computer and formed an automatic control system of said swash plate axis shift turn.

14. A method of universal hybrid operation comprising the steps of:
   (a) providing the engine power adaptation to the wider variable load and speed range by means of simultaneous interaction of an engine and compressor pistons with axial rods each interacting double-sided with a pivotable swash plate, thereby the engine, compressor and pump displacement volume change, and
   (b) providing the axial rod sphere, shoe, washer-shoe and swash plate double-sided interaction without clearance by means of a disc spring initial compressive stress
   (c) providing the engine power adaptation to the wide variable load and speed range by means of increasing the compressor displacement volume and the air pressure magnitude simultaneously with the engine displacement volume increase, and
   (d) providing the engine operation with the minimum specific fuel consumption in the wider variable load and speed range by means of the automatic change of the swash plate angle, and
   (e) providing the engine compression ratio changing by means of the distance between said rotor centerline and the swash plate turn axis alteration in accordance with the formula:

$$A=(2B+L)/(2B-L)$$

where A is the engine compression ratio
      B is the distance between the rotor centerline and the swash plate turn axis
      L is the distance between axial rods centerlines, and
   (f) decreasing the start mode load and the idling mode fuel consumption by means of the smaller engine, compressor and pump displacement volume during the start and idling operation, and
   (g) providing the engine operation with the given fuel independent of the engine, compressor and pump displacement volume alteration by means of using the invariable engine compression ratio while the swash plate turn axis is fixed, and
   (h) providing the engine operation with different fuel by means of the swash plate turn axis shifting and thereby the engine compression ratio changing in accordance with the different fuel, and
   (i) synchronizing the compressor piston and compressor valves motion by means of a rotor's lobes driving the compressor valves and the rotor operates in the capacity of the compressor camshaft, and
   (j) providing the pump smoother fluid flow by means of the pump inlet and outlet slots simultaneously and fluidly interacting with the rotor's plunger and pistons.

* * * * *